(12) United States Patent
Fella et al.

(10) Patent No.: US 7,813,650 B2
(45) Date of Patent: Oct. 12, 2010

(54) OPTICAL SYSTEM

(75) Inventors: Paolo Fella, Valvori (FR); Rodolfo Di Muro, Coventry (GB)

(73) Assignee: Ericsson AB, Stockholm (SE)

( * ) Notice: Subject to any disclaimer, the term of this patent is extended or adjusted under 35 U.S.C. 154(b) by 1135 days.

(21) Appl. No.: 10/533,226

(22) PCT Filed: Oct. 13, 2003

(86) PCT No.: PCT/IB03/05115
§ 371 (c)(1),
(2), (4) Date: Apr. 7, 2006

(87) PCT Pub. No.: WO2004/040809
PCT Pub. Date: May 13, 2004

(65) Prior Publication Data
US 2006/0204244 A1    Sep. 14, 2006

(30) Foreign Application Priority Data
Oct. 31, 2002    (IT)    ............................ MI2002A2329

(51) Int. Cl.
*H04B 10/00* (2006.01)
*H04B 10/12* (2006.01)

(52) U.S. Cl. .................. 398/175; 398/173; 359/334; 359/337.1; 359/341.41; 359/341.42

(58) Field of Classification Search .................. 359/333, 359/334, 337.1, 337.11, 337.12, 337.13, 359/341.1, 341.2, 314.3, 314.41, 341.42; 398/93, 94, 97, 173, 175
See application file for complete search history.

(56) References Cited

U.S. PATENT DOCUMENTS

| | | | |
|---|---|---|---|
| 5,598,289 A * | 1/1997 | Watanabe | 398/177 |
| 6,160,657 A | 12/2000 | Lee et al. | |
| 6,441,950 B1 * | 8/2002 | Chen et al. | 359/334 |
| 2001/0030796 A1 | 10/2001 | Yao | |
| 2002/0196527 A1 * | 12/2002 | Veith | 359/334 |
| 2003/0142395 A1 * | 7/2003 | MacCormack et al. | 359/341.3 |

FOREIGN PATENT DOCUMENTS

EP    0 883 255 A2    12/1998

OTHER PUBLICATIONS

R.W. Tkach et al., "Fibre Brillouin amplifiers", Jan. 1989, Optical and Quantum Electronics, vol. 21, No. 1, pp. S105-S112.*
Lee, Seung Hee, et al., "All Optical Gain-Clamping in Erbium-Doped Fiber Amplifier Using Stimulated Brillouin Scattering", Sep. 1998, IEEE Photonics Technology Letters, vol. 10 No. 9, pp. 1316-1318.*
* cited by examiner

*Primary Examiner*—Ken N Vanderpuye
*Assistant Examiner*—Daniel G Dobson
(74) *Attorney, Agent, or Firm*—Kirschstein, et al.

(57) ABSTRACT

A system and method for controlling the gain of an optical amplifier receiving one or more optical input signal channels at a first end include a source for generating a gain control signal, which is input to the optical amplifier at the opposite end to the input signal channels. The gain control signal is generated at a power level that produces stimulated Brillouin scattering (SBS) in the optical amplifier.

20 Claims, 3 Drawing Sheets

OPTICAL SYSTEM

The present invention relates to the field of optical systems in general and, in particular, to means for controlling the gain of optical amplifiers.

Several types of optical amplifier have been proposed to overcome the effect of signal attenuation in optical transmission paths, particularly fibre. These amplifier types include erbium doped fibre amplifier (EDFA), Thulium doped Silica fibre amplifier (TDSFA), Thulium doped Telluride amplifier (TDTFA), lumped Raman amplifier (RA) and distributed RA.

Raman gain in an optical network is an extremely important means for compensating for signal attenuation or loss in transmission fibre by exploiting stimulated Raman scattering (SRS). Lumped RA and EDFA differ from distributed RA inasmuch in that they exploit as the amplification medium a short length of specially doped fibre with tailored mechanical and optical features. The distributed RA exploits instead the normal transmission fibre as the amplification medium. It differs from lumped RA and EDFA because the amplification medium (the fibre) is not located within a restricted space but can extend over hundreds of kilometres exploiting legacy transmission fibre. Lumped RA and EDFA may be considered as providing optical amplification at a single point of the network, whereas the distributed RA provides optical amplification throughout most of the transmission fibre.

As illustrated in FIG. 6 Raman amplifier gain is dependent on pump and/or signal power variations whereas the spectral gain profile is independent of pump and/or signal power variations. At a fixed Raman pump wavelength, varying the pump power will vary the total gain but not its spectral profile. With the wavelength and power level of the pump fixed, the gain will vary if the optical power experienced by the amplifier changes. In practical applications, the gain of an optical amplifier varies with the aggregate input power, resulting in unwanted variations in output signal levels. This dependence applies to both EDFA and Raman amplifiers; as discussed in: "Properties of Fibre Raman Amplifiers and Their Applicability to Digital Optical Communication Systems", Y. Aoki, Journal of Lightwave Technology, vol. 6, No. 7, July 1988, p. 1225-1239; "Erbium-Doped Fibre Amplifiers, Principles and Applications", E. Desurvire, Wiley-Interscience, New York 1994; "Stimulated Raman Scattering" pp. 125, 134, 428, 430, 534, 543, 549 "Non-linear Fibre Optics", G. P. Agrawal, Academic Press, S. Diego, 1995; "Fibre Raman Amplifiers" pp. 351-357.

The aggregate power level of signals at the input to an optical amplifier can change suddenly, e.g. due to signal switching, system reconfiguration or a fault in a fibre leading to the amplifier.

Referring to FIG. 1, the existing technique for adjusting the optical gain against the above events for discrete optical amplifiers (EDFAs, rare earth doped fibre amplifier and lumped RAs) is illustrated. Optical (WDM) signal channels are input into the amplifier at the left (TX) terminal via a coupler and output from the amplifier via a splitter at the right (Rx) terminal. A locally generated gain adjustment signal is added to the amplifier input signal at the coupler and extracted from the output signal at the splitter. The total power input to the amplifier is monitored by using a splitter at the input to divert a small proportion of the input signal to a photodiode (not shown in the FIG. 1). The power level of the gain adjustment signal is varied to ensure that, when it is added to the input signal channels, the total input power seen by the amplifier is kept substantially constant.

FIG. 2 shows a conventional distributed RA. The amplifier consists of a length of fibre (typically up to a few hundred kilometers). The optical signal channels are input at the left of the figure, typically, as shown, via an EDFA booster amplifier, and pass through the distributed RA benefiting from the Raman amplification effect. The distributed RA is driven by a pump signal generated in a Raman pump and coupled into the fibre at the output (Rx) end of the distributed RA. The Raman pump signal counter-propagates with respect to the signal channels providing amplification by virtue of SRS. This amplification effect is bi-directional and is capable of amplifying signals traveling in either direction through the fibre.

The degree of optical amplification experienced by the signal channels decreases with increasing distance from the amplifier terminal (in this case Rx) where the Raman pump is located.

Two possible approaches to achieving gain control will now be described with reference to a distributed RA:
1) injecting a gain control signal at the transmit (input) end of the amplifier, so as to co-propagate with respect to the signal channels;
2) injecting a gain control signal at the receive (output) end of the amplifier.

However, the following problems affect these approaches:
1) the co-propagating gain control signal would experience optical attenuation while propagating through the transmission fibre, i.e. if we insert the control signal at the amplifier input end, it will experience the same attenuation as the signal channels. The power levels of the signal channels are highest at the amplifier input, where they are inserted and decrease as they pass through the amplifier towards its output. This attenuation is experienced in spite of the gain provided by the distributed RA. The power of both (gain control and signal) channels tends to exponentially decrease along the transmission medium. This means that the total aggregate optical power in the amplifier fibre will vary along the length of the fibre and will not keep to the desired constant level
2) A counter-propagating gain control signal would also not achieve the desired effect because the amplifier gain in a certain direction is determined by the aggregate power level of the signals propagating through the optical amplifier in that direction. The power level of a signal propagating through an amplifier in a first direction will not affect the amplifier gain in the opposite direction.

The object of the present invention is to overcome the above shortcomings and to provide an improved means of controlling gain in an optical amplifier. This object is achieved by use of a gain control signal. Ideally, the control signal should be at a high level where the signal channels are at a low level and vice versa in order to achieve a constant total power in the fibre along the whole length.

The present invention provides A means for controlling the gain of a optical amplifier comprising a source for generating a gain control signal, an optical amplifier for receiving one or more optical input signal channels at a first end and means for providing the gain control signal to the optical amplifier at the other end; in which the source is arranged to generate the gain control signal at a power level that produces stimulated Brillouin scattering (SBS) in the optical.

The present invention also provides A method of controlling the gain of an optical amplifier comprising the steps of introducing one or more optical input signal channels into a first end of the optical amplifier, generating a gain control signal and introducing the gain control signal at the other end of the optical amplifier, in which the gain control signal is generated at a power level that produces stimulated Brillouin scattering (SBS) in the optical amplifier.

Embodiments of the invention will now be described by way of example with reference to the figures in which.

According to the present invention, a gain control signal is inserted at the output of the amplifier and propagates counter to the signal channels. This ensures that, advantageously, the gain control signal power level is highest at the output end of the fibre, where it is inserted and where the aggregate power level of the signal channels is lowest. The gain control signal power level decreases as it passes back along the fibre to the amplifier input end. This means that the gain control signal power level is lowest at the input end of the amplifier fibre, where the aggregate power level of the signal channels is highest. Insertion of the gain control signal at the output end of the amplifier tends to compensate for attenuation of the input signal channels thus resulting in the aggregate optical power being almost constant throughout the fibre.

Figure 1:
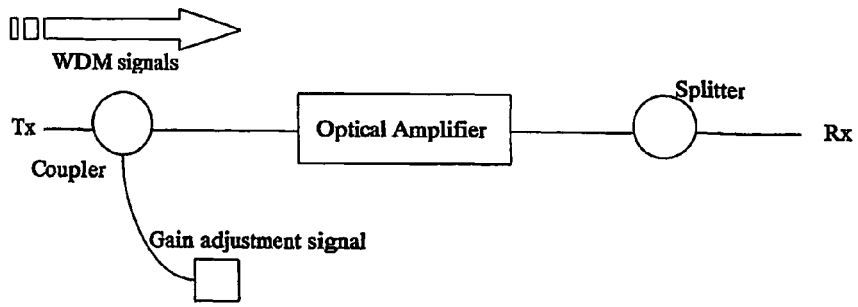
FIGS. 1 and 2 show conventional amplifier arrangements.
Figure 2:
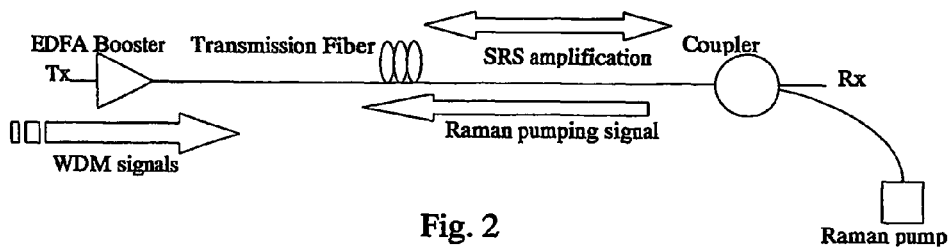
Figure 3:
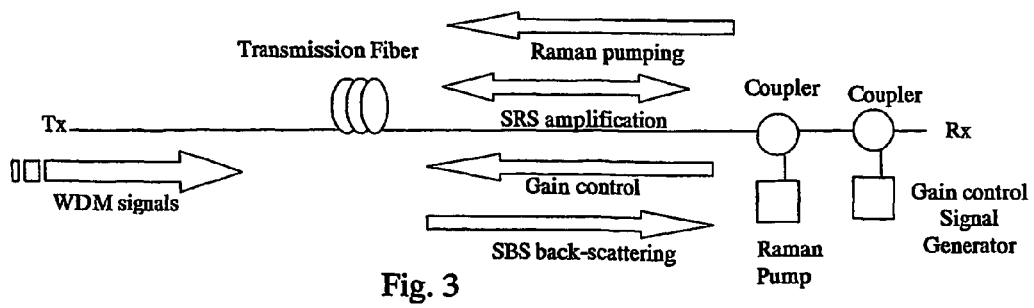
FIG. 3 shows an amplifier arrangement according to the present invention.
Figure 4:
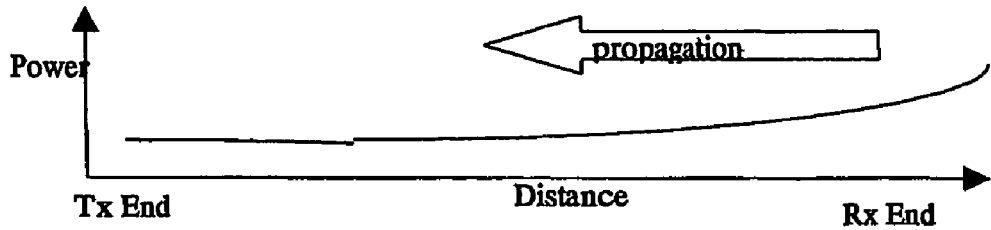
FIGS. 4 and 5 show signal propagation in a fibre.
Figure 4:
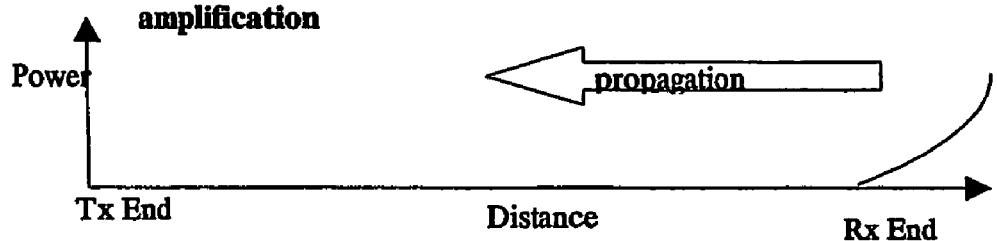

FIG. 3 shows gain control in a distributed RA according to the present invention. The distributed RA of FIG. 3 is basically similar to that already described with reference to FIG. 2. However, in addition to the normal Raman pump signal, an extra signal channel called "gain control signal" is generated locally and inserted into the fibre via an additional coupler at the amplifier output (Rx). To avoid interference with the signal channels, the gain control signal is generated with a wavelength that is around 10 to 15 nm higher than the input signal channels, but still within the gain-bandwidth of the distributed RA so that it benefits from the gain of the distributed RA, as illustrated in FIG. 4.

The gain control signal of the present invention works by generating stimulated Brillouin scattering (SBS) in the distributed RA fibre. The SBS is obtained by setting the gain control signal level to exceed a certain launch power (the SBS threshold power). As noted above, the SBS signal is generated in the opposite direction to that of the generating signal. In this case, the generating signal is the gain control signal, so that the SBS is generated in the same direction as the signal channels. Hence, the SBS has the desired effect of altering the gain experienced by the signal channels.

The SBS depletes the power of the gain control signal in a distributed way (i.e. gradually as the gain control signal propagates along the fibre). The SBS depletion of the generating gain control signal consists solely of back-scattering a part of the power of the generating signal.

The SBS is generated depending on the power level of the gain control signal. In order to operate in optimum conditions the power level of the gain control signal is monitored, e.g. using a photodiode detector.

The distributed Raman gain control will now be described with reference to FIG. 3. FIG. 3 shows a distributed RA similar to that shown in FIG. 2. The optical (WDM) signal channels are input at the left (Tx) end of the amplifier and pass through the amplifier benefiting from the Raman amplification effect. Amplification is driven by a pump signal generated in a Raman pump and coupled into the fibre at the output (Rx) end of the amplifier. As with the Raman amplifier of FIG. 2, the pump signal counter-propagates with respect to the signal channels, providing amplification by virtue of SRS.

In addition, a gain control signal generator is provided whose output is fed into the distributed RA output via an additional coupler. The gain control signal propagates through the amplifier fibre in the opposite direction to the signal channels and a back-scattered signal is generated by SBS in the same direction as the signal channels. Both the gain control signal and its SBS-backscattered component benefit from the bi-directional acting Raman amplification in the fibre and, as a result, the ranges of both the gain control signal and its SBS back-scattered component through the fibre are improved. The SBS backscattered signal co-propagates with the signal channels, thus providing gain control in the direction of the signal channels by compensating for signal channel losses in the amplifier fibre.

Constant Power Across the Fibre

Figure 5:
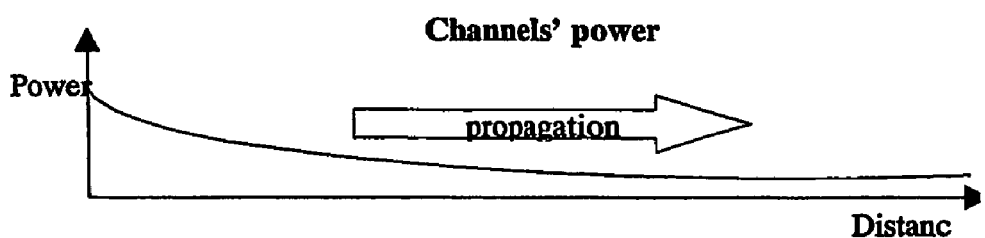
Figure 5:
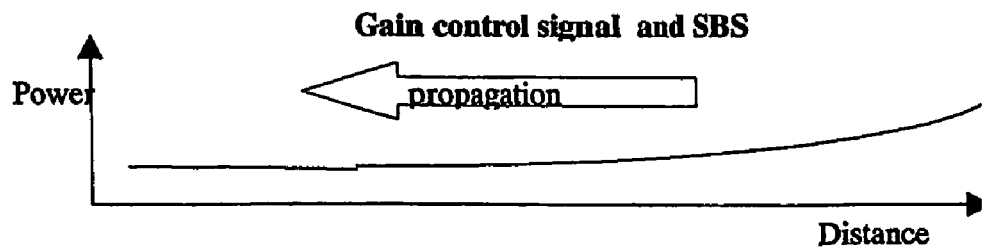
Figure 6:
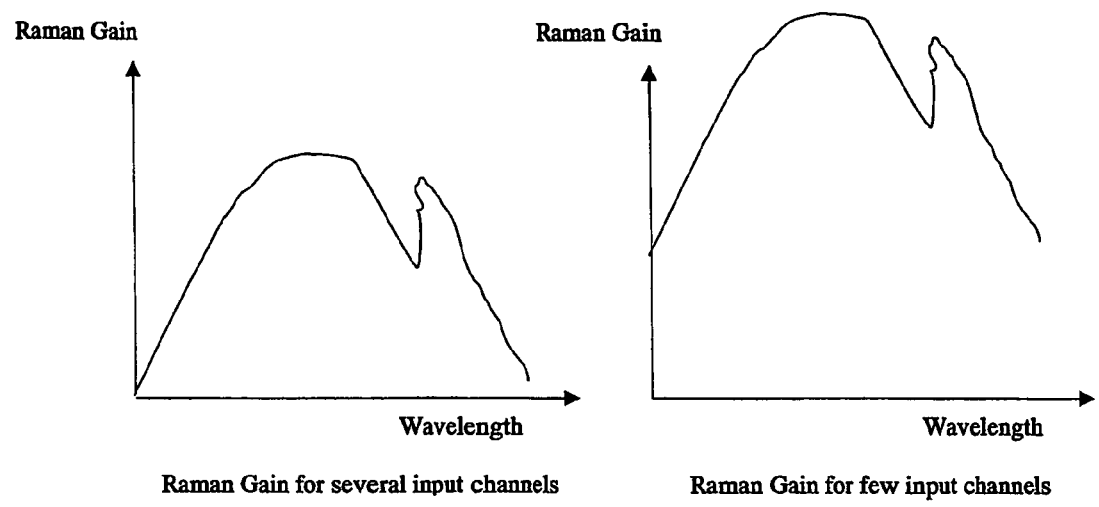
FIG. 6 shows the gain spectrum for a typical distributed Raman amplifier.

The distributed RA extends across a very long fibre and may be considered as consisting of a large series of small sections of fibre. Every section of the fibre should ideally experience the same power level. The power level in any section in the direction of the signal channels is the sum of the power of the aggregate signal channels and the SBS-backscattered component of the gain control signal power in that section The power of the gain control signal (and the resultant SBS signal) will lessen along the length of the fibre from the output (Rx) end due to attenuation, as shown in FIG. 4. The power of the input signal channels will lessen along the length of the fibre from the input (Tx) end due to attenuation, as shown in FIG. 5. It is clear that there are conditions (such as fibre length or fibre impurity) wherein the variation in SBS power across the length of the fibre can almost exactly compensate for the attenuation in the signal channels power across the fibre. If so, it is possible to maintain a constant total power across all the fibre sections. These conditions will vary on a case by case basis.

In addition, in order to achieve the desired constant power level, the power level of the gain control signal (and its SBS scattered component) must be arranged to vary so as to compensate for variations in the aggregate power of the signal channels input to the amplifier. This is achieved by varying the launch power of the gain control signal to provide a corresponding variation in the SBS scattered counterpart. This requires that the input signal channels be monitored, as set out below.

The launch power of the gain control signal will depend on the number and power of input signal channels. The selection of gain control signal power can conveniently be provided by a controller function. This may, for example, be conveniently provided by a microprocessor integrated into a module housing the amplifier or terminating one end of it.

The controller function measures the power output from the amplifier and monitors the level of the gain control signal. The controller is provided with look-up tables recording the power level of each input signal channel and/or algorithms for deciding what effect a change to an input signal will have. The power levels of the input signal channels will depend on many factors, such as link characteristics, transmission fibre type (e.g.: fibre effective area, attenuation, manufacturer). Furthermore, the levels will depend on the fibre span, the channel band (C- or L-band), the Raman pump wavelength and the Raman gain needed for the signal transmission. In general, all this information is collected by system design and network modelling engineers, who elaborate it in order to set out all the possible (static and dynamic) system settings required to provide reliable transmission in all foreseeable circumstances. This elaboration is carried out on a case-by-case basis. It should be noted that circumstances include different characteristics of different optical links.

Information on the input signal channels is usually provided to the controller function by conventional optical supervisory channels for WDM systems, although any pilot tone could be used for this purpose. This information can, alternatively, be given by an optical channel monitor that monitors in real-time the number of input signal channels. Relying on power look-up tables, it is possible (on a case by case basis) to know how much power is associated with each channel. The controller function is thus aware of the input power seen by the amplifier corresponding to the current input channel signals present.

Gain Control Signal Launch Power

As indicated above, the Launch Power of the gain control signal should overcome the SBS power threshold. This threshold power, $P^{th}$, can be calculated by the following formula:

$$P^{th}=21A_e/g_b*L_e(1+\Delta f_{source}/B_{SBS})$$

where
$A_e$ is the fibre effective area;
$g_b=4*10^{-11}$ [m/W];
$L_e$=effective fibre length;
$\Delta f_{source}$ is the gain control source optical bandwidth; and
$B_{SBS}$ is the interaction bandwidth=20 MHz.

The gain control signal should preferably have a bandwidth ($\Delta f$) similar to that of conventional DFB lasers in order to make the gain control signal more effective and easier to generate. For example, a gain control signal bandwidth of 20 MHz or of 100 MHz could be selected In the latter 100 MHz case, the SBS threshold will be higher than in the 20 MHz case, requiring more power. In order to make an assessment, consider the following comparison:
ideal source ($\Delta f$=0) SBS $P^{th}$~1 mW;
real source ($\Delta f$~100 MHz) SBS $P^{th}$~10 mW.

Depending on the effective length of the transmission fibre, the SBS threshold can vary (i.e. it tends to increase with length), as shown by the above formula.

In order to benefit from the distributed RA gain, the wavelength of the gain control signal should be kept within a certain waveband of the highest signal channel, for example, no more than about 15 nm above the highest signal channel.

PROBLEMS SOLVED BY THE INVENTION

A gain controlled amplifier enhanced according to the present invention acts to stabilise the gain whatever static or dynamic WDM link conditions prevail. Furthermore, it provides a constant gain in a reliable way. The amplifier's noise figure will be improved as a result of the gain control and will show a significant decrease for low signal power levels. Moreover, gain transients will be reduced. For Raman amplifiers, once the pump power is set, the amplifier should need neither intervention, maintenance nor provisioning during its working lifetime whilst, at the same time, providing improved amplification performance.

The changes of input signal channel power include any increasing/decreasing of the number of channel signals (at fibre's input and added/dropped locally along the fibre), optical fibre cuts, optical fibre ageing, optical fibre repair, sudden add/drop of channel signals, channel signal switching, channel signal optical routing, optical tributary faults, optical amplifier malfunction, optical fibre bends, incidental optical fibre connectors disconnection, environmental conditions and any other means for changing the power of the channel signals.

This will be of great benefit for system and network designers and for installation, provisioning and maintenance engineers. For instance, upgrading the number of WDM installed signal channels (and thereby increasing the signal power into the amplifier) may be carried out without any external adjustment of the amplifier.

The absence of any gain transient even in the presence of a network failure (i.e. sudden loss of signal channels) makes a gain controlled amplifier according to the present invention very useful for both present and future WDM applications.

The present invention can also be used to change the gain of an optical amplifier, as desired.

The invention provides a low cost solution that is easy to implement because it can be based on a readily available and economic DFB, commodity laser, at a standard wavelength for transmissions onto optical fibres, at a low launch power, together with a cheap, widely available optical coupler to inject the gain control signal into the transmission medium with negligible insertion loss (~0.05, 0.1 dB).

The invention is not limited to the embodiments described above by way of example. The present invention applies to amplifiers with fibre or other optical media doped with Erbium, Thulium, Fluoride, Tellurium, Lanthanum, Aluminum, Germanium, Praseodymium, Bismuth, lumped and distributed Raman amplifiers and will also apply to other types of optical amplifier in which gain is affected by signal level. The dopants can be used singly or in combination or mixed in a custom way, as to both type and relative concentration.

The distributed RA may be operated alone or in combination with EDFAs, hybrid EDFAs and lumped RAs, e.g. with an EDFA acting as a booster located at the input end of the transmission fibre and with a Raman amplifier placed at the output end of the fibre. The present invention applies to amplifiers with either backward, forward or a combination of backward and forward (simultaneous) pumping. The present invention applies to Raman amplifiers with backward and/or forward pumping of first and/or second and/or third Raman pumping order via a single or a plurality of pump lasers at different wavelengths.

The invention claimed is:

1. An apparatus for controlling optical amplifier gain, comprising:
   a) a source for generating a gain control signal;
   b) an optical amplifier for receiving at least one of optical input signal channels at a first end, the optical amplifier comprising an amplification medium;
   c) a coupler for providing the gain control signal to the optical amplifier at a second end thereof; and
   d) the source being arranged to generate the gain control signal at a power level greater than the stimulated Brillouin scattering threshold of the amplification medium to produce stimulated Brillouin scattering in the amplification medium of the optical amplifier, wherein the gain control signal is at a higher wavelength than any of the optical input signal channels.

2. The apparatus according to claim 1, comprising a controller for identifying a change in an input signal and for varying the power level of the gain control signal to compensate for the identified change.

3. The apparatus according to claim 2, in which the controller comprises a monitor for monitoring a power of the input signal and for varying the power level of the gain control signal to compensate for changes in the monitored power.

4. The apparatus according to claim 2, in which the controller comprises apparatus for obtaining information on the at least one optical input signal channel from one of an optical supervisory channel and a pilot tone.

5. The apparatus according to claim 1, in which the gain control signal falls within a gain bandwidth of the optical amplifier.

6. The apparatus according to claim 1, further comprising a monitor for monitoring the power level of the gain control signal.

7. The apparatus according to claim 1, in which the amplifier is a Raman amplifier.

8. The apparatus according to claim 1, in which the amplifier is a distributed Raman amplifier.

9. The apparatus according to claim 1, in which the amplifier is a rare earth doped fiber amplifier.

10. A method of controlling optical amplifier gain, comprising the steps of:
   a) introducing at least one of optical input signal channels into a first end of an optical amplifier, the optical amplifier comprising an amplification medium;
   b) generating a gain control signal and introducing the gain control signal at a second end of the optical amplifier; and
   c) generating the gain control signal at a power level greater than the stimulated Brillouin scattering threshold of the amplification medium to produce stimulated Brillouin scattering in the amplification medium of the optical amplifier, wherein the gain control signal is at a higher wavelength than any of the optical input signal channels.

11. The method according to claim 10, including the steps of identifying a change in an input signal and varying the gain control signal power level to compensate for the identified change.

12. The method according to claim 11, including the step of monitoring a power of the input signal and varying the gain control signal power to compensate for a change in the monitored power.

13. The method according to claim 11, including obtaining information at the at least one optical input signal channel from one of an optical supervisory channel and a pilot tone.

14. The method according to claim 10, in which the gain control signal falls within a gain bandwidth of the optical amplifier.

15. The method according to claim 10, further including the step of monitoring the power level of the gain control signal.

16. The method according to claim 10, in which the amplifier is a Raman amplifier.

17. The method according to claim 10, in which the amplifier is a distributed Raman amplifier.

18. The method according to claim 10, in which the amplifier is a rare earth doped fiber amplifier.

19. The apparatus according to claim 1, wherein the wavelength of the gain control signal is around 10 to 15 nm higher than any of the optical input signal channels.

20. The method according to claim 10, wherein the wavelength of the gain control signal is around 10 to 15 nm higher than any of the optical input signal channels.

* * * * *